United States Patent [19]

Koskan et al.

[11] Patent Number: 5,391,764
[45] Date of Patent: Feb. 21, 1995

[54] POLYASPARTIC ACID MANUFACTURE

[75] Inventors: Larry P. Koskan, Orland Park; Kim C. Low, Alsip; Abdul Rehman Y. Meah, Justice; Anne Marie Atencio, Riverdale, all of Ill.

[73] Assignee: Donlar Corporation, Bedford Park, Ill.

[21] Appl. No.: 219,667

[22] Filed: Mar. 29, 1994

Related U.S. Application Data

[60] Division of Ser. No. 80,562, Jun. 21, 1993, Pat. No. 5,315,010, which is a continuation-in-part of Ser. No. 660,355, Feb. 22, 1991, Pat. No. 5,221,733.

[51] Int. Cl.⁶ .......................................... C07D 207/40
[52] U.S. Cl. .................................................. 548/520
[58] Field of Search .......................................... 548/520

[56] References Cited

U.S. PATENT DOCUMENTS 5,221,733 6/1993 Koskan et al. ........................ 530/333

Primary Examiner—Mary C. Lee
Assistant Examiner—Joseph K. McKane
Attorney, Agent, or Firm—Olson & Hierl, Ltd.

[57] ABSTRACT

Polyaspartic acid is produced by hydrolysis of anhydropolyaspartic acid that has been produced by thermal condensation polymerization of L-aspartic acid. Conversion in excess of 80 percent is achievable utilizing "temperature vs. time" profiles.

7 Claims, 4 Drawing Sheets

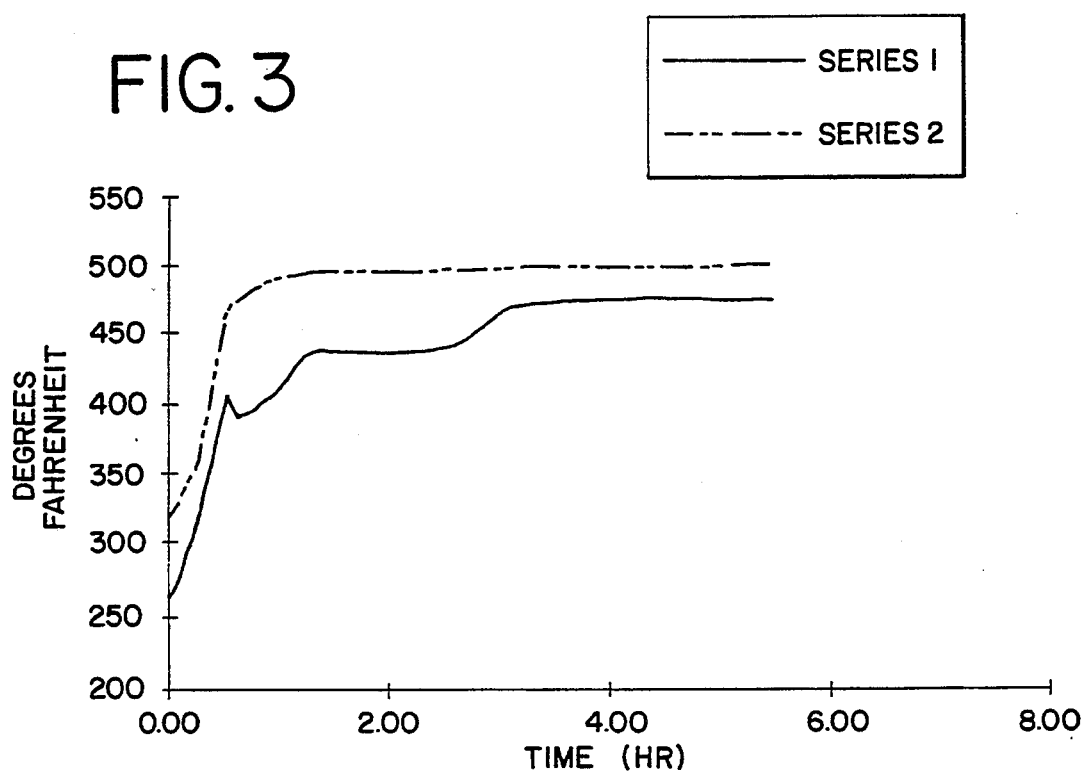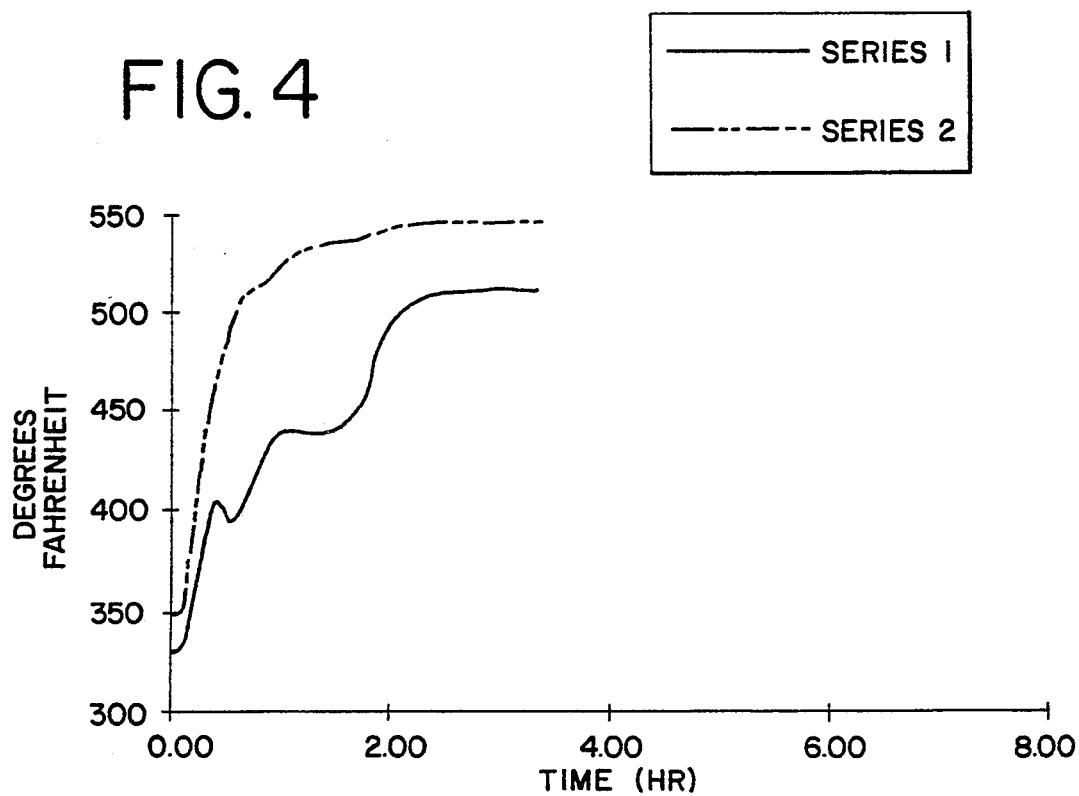

POLYASPARTIC ACID MANUFACTURE

CROSS-REFERENCE TO RELATED APPLICATION

This application is a division of application U.S. Ser. No. 08/080,562, filed Jun. 21, 1993, now U.S. Pat. No. 5,315,010, which, in turn, is a continuation-in-part of U.S. Ser. No. 07/660,355, filed Feb. 22, 1991, now U.S. Pat. No. 5,221,733, granted Jun. 22, 1993.

FIELD OF THE INVENTION

The present invention relates to a method of polymerizing aspartic acid and to polysuccinimides and polyaspartic acids prepared by such method.

BACKGROUND OF THE INVENTION

Polyaspartic acids have utility as calcium carbonate and calcium phosphate inhibitors. Their biodegradability makes them particularly valuable from the point of view of environmental acceptability and waste disposal.

Anhydropolyaspartic acids (i.e., polysuccinimides) are the anhydrous forms of polyaspartic acids.

Thermal condensation of aspartic acid to produce polyaspartic acid is taught by Etsuo Kokufuta, et al., "Temperature Effect on the Molecular Weight and the Optical Purity of Anhydropolyaspartic Acid Prepared by Thermal Polycondensation," Bulletin of the Chemical Society Of Japan 51(5):1555–1556 (1978). Kokufuta et al. teach that the molecular weight of the polyaspartic acid produced by this method increases with increased reaction temperature. Moreover, the suggested maximum percent conversion of the aspartic acid to anhydropolyaspartic acid is no more than 68% using oil bath temperatures of between 325° F. and 425° F.

A more recent work by Brenda J. Little et al., "Corrosion Inhibition By Thermal Polyaspartate" *Surface Reactive Peptides and Polymers*, pp 263–279, American Chemistry Society Symposium Series 444(1990), cites Kokufuta et al. Oil bath temperatures of 374° F. were reportedly used to produce anhydropolyaspartic acid from powdered aspartic acid over a period of 24 to 96 hours. The reported results were no better than those reported by Kokufuta et al., however.

SUMMARY OF THE INVENTION

The method of the present invention provides a much higher conversion of L-aspartic acid to polysuccinimide and polyaspartic acid than has been taught or suggested by the prior art. Moreover, contrary to the teachings of the prior art, the molecular weight of the polyaspartic acid produced by our method does not increase with the reaction temperature.

We have discovered that the thermal condensation of powdered L-aspartic acid to produce polysuccinimide in relatively high yields optimally occurs above the initiation temperature of about 370° F., and preferably occurs above about 420° F., and most preferably occurs above about 440° F.

While a reactant temperature of less than about 370° F. may produce polysuccinimide over a period of many hours, the theoretical yields will be low. The conversion of the L-aspartic acid to polysuccinimide is likely to be less than 70% over a period of many days.

On the other hand, as the reactant temperature is increased above 370° F., the percent conversion increases to greater than 90%, and the reaction times are greatly reduced.

The thermal condensation of L-aspartic acid to polysuccinimide according the method of our invention produces a characteristically shaped "temperature vs. time" reaction curve. The curve is characterized by an initial, rapid rise in reactant temperature, followed by an endotherm signaling the beginning of the reaction. Immediately following the onset of the endotherm there is evaporative cooling, followed first by a temperature rise, and then by a second endotherm, which is followed by an evaporative cooling plateau. The temperature then rises to a substantially constant plateau. The condensation reaction has gone to at least 95% conversion at a temperature approximately midway between the final plateau and the time the temperature begins to rise to that plateau.

Polyaspartic acid is produced from the polysuccinimide by base hydrolysis of the polysuccinimide.

The produced polyaspartic acid has a weight average molecular weight of 1000 to 5000. This molecular weight range is uniform regardless of the percent conversion.

The percent conversion of the L-aspartic acid to the polysuccinimide can be increased in reduced time periods by increasing the temperatures used.

Where the thermal fluid used to heat the L-aspartic acid is brought to 500° F. in a reasonable time period, at least 90% conversion can be effected within 4 hours.

Where the thermal fluid used to heat the L-aspartic acid is brought to a maintenance temperature of at least 550° F. within a reasonable time period, at least 90% conversion can be effected within 2 hours.

Continuous as well as batch processes can be used. The process can be carried out in a fluidized bed; in a stirred reactor; in an indirectly heated rotary drier, in an indirectly heated plate drier, and the like.

BRIEF DESCRIPTION OF THE DRAWINGS

FIG. 3 depicts a temperature versus time reaction curve. Series 2 is the oil temperature. Series 1 is the reaction mixture temperature.

FIG. 4 depicts a temperature versus time reaction curve. Series 2 is the oil temperature. Series 1 is the reaction temperature.

DESCRIPTION OF PREFERRED EMBODIMENTS

Figure 1:
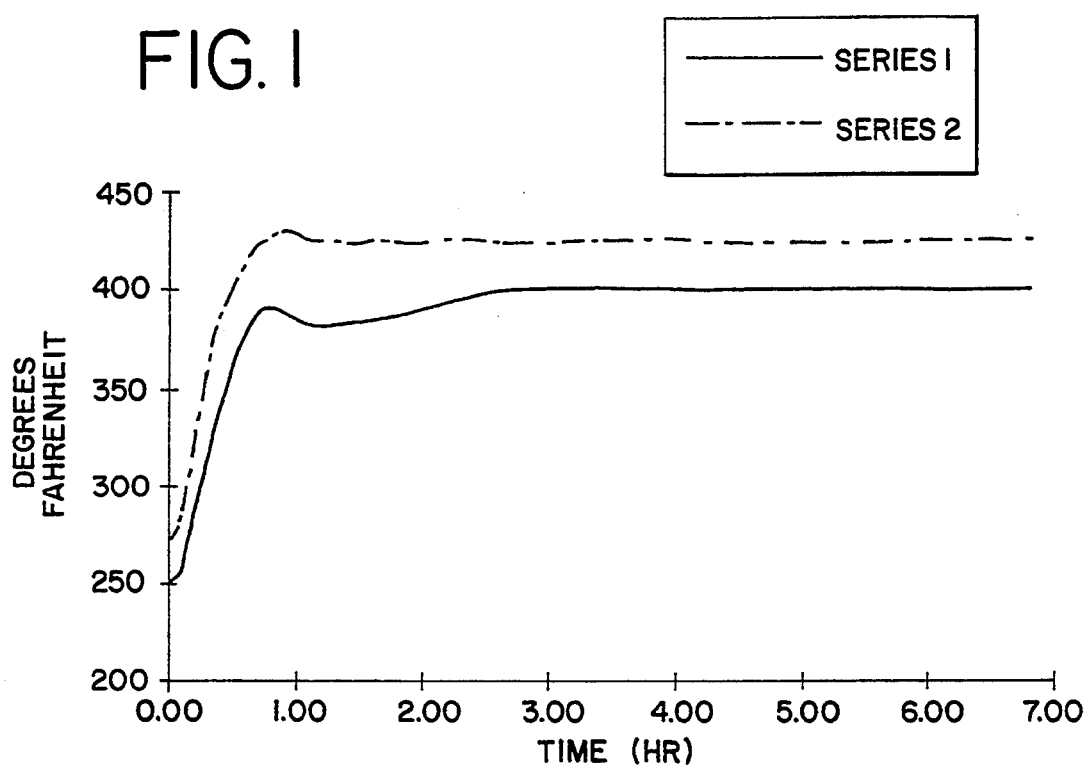
FIG. 1 depicts a temperature versus time reaction curve. Series 2 is the oil temperature. Series 1 is the reaction mixture temperature.

A series of experiments were conducted to thermally polymerize solid phase L-aspartic acid to polysuccinimide. In each instance, the powdered L-aspartic acid was added to a reaction vessel and heated. Samples were taken throughout the course of the polymerization reaction. Those samples were analyzed for percent conversion to the product, polysuccinimide. The color and temperature of the samples were noted as well. The produced polysuccinimide was then hydrolyzed to produce polyaspartic acid. Activity tests were conducted on the polyaspartic acid.

Each of these, conversion, color, production of polyaspartic acid, and activity are described below.

The following procedure was utilized to determine the percent conversion of the L-aspartic acid to the product, polysuccinimide:

THE DETERMINATION OF CONVERSION OF L-ASPARTIC ACID TO POLYSUCCINIMIDE

A specific amount of the reaction mixture or product was dissolved in an aliquot of dimethylformamide (DMF). The dissolution was allowed to proceed for 4 to 5 hours until all of the polysuccinimide dissolved in the DMF, leaving unreacted L-aspartic acid which was filtered out. The amount of unreacted L-aspartic acid was determined and used in the following formula:

$$\% \text{ CONVERSION} = \frac{A - B}{A} * 100\%$$

Where:
A = weight of initial sample
B = weight of residue (unreacted L-aspartic acid)

COLOR

The color of each product sample was noted. The color of L-aspartic acid is white. The samples containing polysuccinimide varied in color according to the temperature of the sample taken from the reaction mixture. From low temperature to high, the colors varied as follows: light pink, to pink, to tannish pink, to tan, to light yellow, to yellow, respectively. These colors generally corresponded to the percent conversion of the L-aspartic acid, in the same order with light pink indicating the lowest percent conversion and yellow indicating the highest percent conversion. The pink colors had less than 70 conversion. The literature has never reported any other color but pink.

POLYASPARTIC ACID

Polyaspartic acid was produced from polysuccinimide using the following hydrolysis procedure:
Hydrolysis Procedure for Making Polyaspartic Acid from Polysuccinimide A slurry was made from a measured amount of polysuccinimide and distilled water. Sodium hydroxide was added dropwise to hydrolyze polysuccinimide to polyaspartic acid. Complete hydrolysis was attained at pH 9.5.

Bases other than sodium hydroxide can be used for hydrolysis. Suitable bases include ammonium hydroxide, potassium hydroxide, and other alkaline and alkaline earth hydroxides.

Generally, the base is added to the polysuccinimide slurry until the pH value thereof reaches about 9.5, and a clear solution has been formed.

ACTIVITY TEST

Polyaspartic acid was produced from the samples of polysuccinimide. The activity of the polyaspartic acid as an inhibitor for preventing the precipitation of calcium carbonate was determined as described in the test below:

A standard volume of distilled water was pipetted into a beaker. Inhibitor (polyaspartic acid) was added after the addition of a calcium chloride solution, but prior to the addition of a solution of sodium bicarbonate. Sodium hydroxide was then added to the solution until there was an apparent and sudden calcium carbonate precipitation evidenced by the cloudiness of the solution.

At this point the pH dropped, the addition of the sodium hydroxide was stopped, and the pH was recorded. The volume of sodium hydroxide consumed was noted. The pH drop after ten minutes was recorded.

The amount of inhibitor used was adjusted to provide a constant weight of polyaspartic acid in each of the tests.

The activity of the inhibitor was judged by the volume of sodium hydroxide consumed and by the pH drop. The greater the amount of sodium hydroxide needed, the greater the activity of the product as an inhibitor. The smaller the pH drop, the greater the activity of the product as an inhibitor.

MOLECULAR WEIGHT DETERMINATION

Gel permeation chromatography was utilized to determine the molecular weights of the polyaspartic acid produced. The molecular weight determinations were made on the polysuccinimide that was hydrolyzed using the hydrolysis procedure described herein.

Rohm & Haas 2000 Mw polyacrylic acid and Rohm & Haas 4500 Mw polyacrylic acid were utilized as standards. The molecular weights provided for the polyaspartic acid produced according to this invention are based on these standards unless otherwise noted, and are reported as weight average molecular weights,(Mw). This is because molecular weights based on gel permeation chromatography can vary with the standards utilized.

It was found that the molecular weight for the polyaspartic acid produced fell within the range of 1000 Mw to 5000 Mw, regardless of percent conversion.

The term polyaspartic acid used herein also includes salts of polyaspartic acid. Counterions for polyaspartate include cations such as $Na^+$, $K^+$, $Mg^+$, $Li^+$, $Ca^{++}$, $Zn^{++}$, $Ba^{++}$, $Co^{++}$, $Fe^{++}$, $Fe^{+++}$, and $NH_4^+$.

Polysuccinimide is the imide form of polyaspartic acid and is also known as anhydropolyaspartic acid.

Conversion is defined to be the degree to which L-aspartic acid has formed polysuccinimide by thermal condensation.

Equilibrium temperature is defined to be the temperature of the product upon completion of the reaction.

EXPERIMENTS

Reported below are examples of the production of polysuccinimide and polyaspartic acid.
Laboratory Experiment 1

A "time vs. temperature" plot of the following reaction is depicted in FIG. 1.

A 500-ml covered, stainless steel beaker charged with 400 grams of powdered L-aspartic acid was placed in an oil bath. The oil bath was quickly heated to a 425° F. maintenance temperature. The sample was stirred throughout the experiment.

At 40 minutes, the reaction began when the first endotherm was reached. The first endotherm of the reaction mixture peaked at 390° F. at an oil temperature of 425° F. which was the maintenance temperature.

Evaporative cooling immediately followed this first endotherm. Water loss was evidenced by the evolution of steam. The reaction mixture temperature dropped to a low of 360° F. during this period. Following the temperature drop, the reaction mixture began to heat up. At 2.75 hours, the reaction mixture attained a plateau temperature of 400° F. At the end of 6.88 hours, 42 percent conversion had been attained. Steam coming from the system evidenced water loss throughout the entire endothermic reaction. Evaporative cooling still continued to take place. The experiment was concluded after seven hours.

Table 1 below provides data developed during this experiment. Samples were taken at the times indicated and analyzed for percent conversion to polysuccinimide.

The relative activity of polyaspartic acid produced from the product polysuccinimide was determined by the activity test described above. Activity is reported in terms of pH drop ($\delta$pH) and milliliters (ml) of sodium hydroxide, as described in the Activity test.

The color of the reaction mixture is provided. Color was observed to vary with product temperature.

TABLE 1

| POLYMERIZATION | | | | ACTIVITY TEST | | |
|---|---|---|---|---|---|---|
| Time, hr. | Product, °F. | Oil, °F. | Conv. % | NaOH, ml | $\delta$pH | Color |
| 0.0 | 250 | 270 | 0 | 0.95 | 1.47 | LP |
| 1.0 | 386 | 430 | 5 | — | — | LP |
| 1.7 | 385 | 425 | 13 | 1.75 | 0.56 | P |
| 3.4 | 401 | 425 | 26 | 1.75 | 0.56 | P |
| 5.0 | 400 | 424 | 27 | 1.75 | 0.56 | P |
| 6.9 | 400 | 425 | 42 | 1.80 | 0.57 | P |

The following definitions apply through out this writing:
LP=light pink
LY=light yellow
P=Pink
T=Tan
W=White
Y=Yellow
Conv.=Conversion
$\delta$pH=activity test pH drop
hr=hours Laboratory Experiment 2

Figure 2:
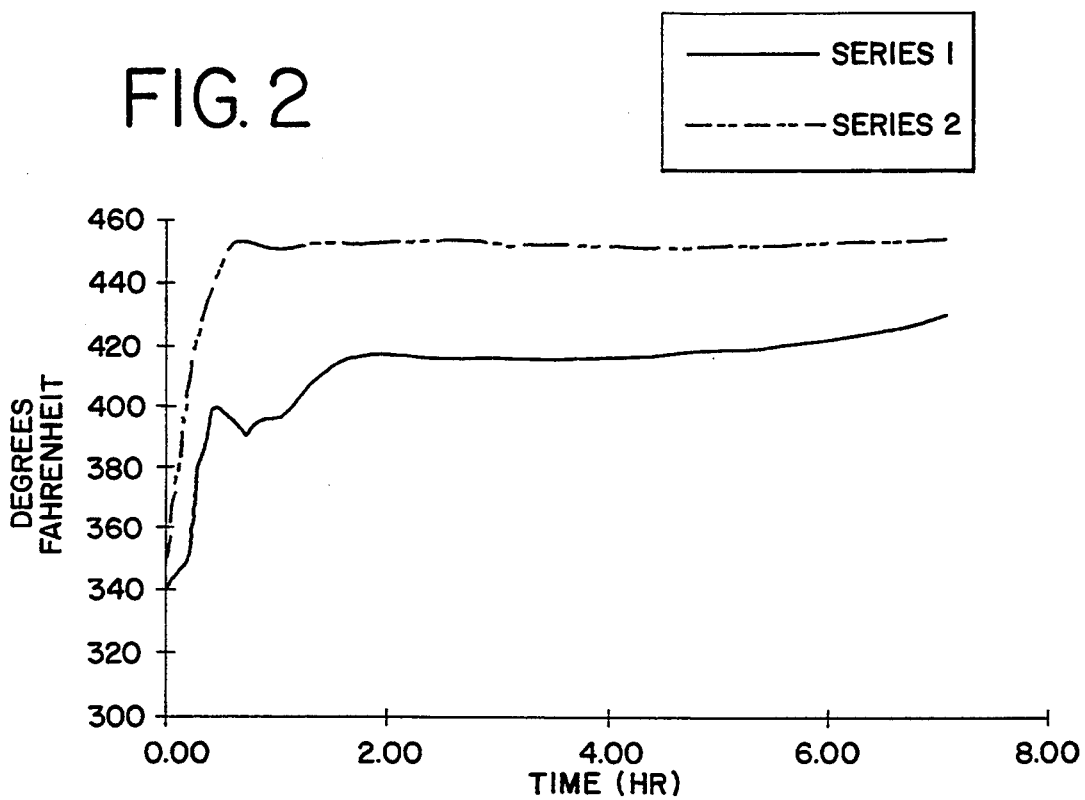
FIG. 2 depicts a temperature versus time reaction curve. Series 2 is the oil temperature. Series 1 is the reaction mixture temperature.

A "time vs. temperature" plot of the following reaction is depicted in FIG. 2.

A 500-ml covered, stainless steel beaker charged with 400 grams of powdered, L-aspartic acid was placed in an oil bath. The oil bath was quickly heated to a 450° F. maintenance temperature. The sample was stirred throughout the experiment.

At 30 minutes, the reaction began when the first endotherm was reached. The first endotherm of the reaction mixture peaked at 395° F. at an oil temperature of 439° F.

Evaporative cooling immediately followed this first endotherm. Water loss was evidenced by the evolution of steam. The reaction mixture temperature dropped to a low of 390° F. during this period and the oil temperature rose to the 450° F. maintenance temperature.

Following the temperature drop, the reaction mixture began to heat up. At 1.67 hours, a second endotherm occurred. At this endotherm, the reaction mixture temperature was 450° F. and the oil temperature was 450° F. Steam coming from the system evidenced water loss.

Evaporative cooling continued to take place until the conclusion of the second endotherm. Water loss was evidenced by the evolution of steam. At the conclusion of this period, the reaction mixture was then heated up and maintained at an equilibrium temperature of 434° F.

Table 2 below provides data developed during this experiment. Samples were taken at the times indicated and analyzed for percent conversion to polysuccinimide.

The relative activity of polyaspartic acid produced from the product polysuccinimide was determined by the activity test described above. Activity is reported in terms of pH drop ($\delta$pH) and milliliters (ml) of sodium hydroxide, as described in the activity test.

The color of the reaction mixture is provided. Color was observed to vary with product temperature.

TABLE 2

| POLYMERIZATION | | | | ACTIVITY TEST | | |
|---|---|---|---|---|---|---|
| Time, hr. | Product, °F. | Oil, °F. | Conv. % | NaOH, ml | $\delta$pH | Color |
| 0.0 | 340 | 345 | 0 | 0.95 | 1.47 | W |
| 0.5 | 400 | 440 | 22 | — | — | LP |
| 1.1 | 396 | 451 | 23 | 1.75 | 0.59 | LP |
| 1.7 | 422 | 457 | 32 | 1.80 | 0.57 | P |
| 4.2 | 416 | 451 | 58 | 1.81 | 0.61 | P |
| 5.5 | 420 | 452 | 81 | 1.80 | 0.63 | T |
| 7.1 | 430 | 454 | 97 | 1.75 | 0.69 | T |

Laboratory Experiment 3

A "time vs. temperature" plot of the following reaction is depicted in FIG. 3.

A 500-ml covered, stainless steel beaker charged with 400 grams of powdered, L-aspartic acid was placed in an oil bath. The oil bath was quickly heated to a 500° F. maintenance temperature. The reaction mixture was stirred throughout the experiment.

At 30 minutes, the reaction began when the first endotherm was reached. The first endotherm of the reaction mixture peaked at 405° F. at an oil temperature of 465° F.

Evaporative cooling immediately followed the first endotherm. Water loss was evidenced by the evolution of steam. The reaction mixture temperature dropped to a low of 390° F. during this period, and the oil temperature rose to 490° F.

At 1.25 hours, a second endotherm occurred. At this second endotherm, the reaction mixture temperature was 438° F. and the oil temperature was 495° F.

Evaporative cooling continued to take place until the conclusion of the second endotherm. Water loss was evidenced by the evolution of steam. The reaction mixture temperature dropped to a low of 432° F. during this period and the oil temperature rose to 499° F.

A diminution in evaporative cooling was evidenced by a steady rise in reaction mixture temperature between approximately 2.65 hours and %1%, hours. At 3.17 hours a temperature plateau was attained. No further increase in conversion was noted beyond that point.

Table 3 below provides data developed during this experiment. Samples were taken at the times indicated and analyzed for percent conversion to polysuccinimide.

The relative activity of polyaspartic acid produced from the product polysuccinimide was determined by the activity test described above. Activity is reported in terms of pH drop ($\delta$pH) and milliliters (ml) of sodium hydroxide, as described in the activity test.

The color of the reaction mixture is provided. Color was observed to vary with product temperature.

TABLE 3

| POLYMERIZATION | | | | ACTIVITY TEST | | |
|---|---|---|---|---|---|---|
| Time, hr. | Product, °F. | Oil, °F. | Conv. % | NaOH, ml | δpH | Color |
| 0.0 | 256 | 316 | 0 | 0.95 | 1.47 | W |
| 0.5 | 406 | 464 | 7 | — | — | LP |
| 1.3 | 437 | 496 | 43 | 1.80 | 0.56 | P |
| 2.3 | 438 | 497 | 81 | 1.80 | 0.56 | P |
| 3.1 | 470 | 499 | 90 | 1.80 | 0.67 | TP |
| 3.8 | 476 | 500 | 95 | 1.80 | 0.63 | TP |
| 6.0 | 476 | 502 | 98 | 1.80 | 0.63 | LY |

Laboratory Experiment 4

A "time vs. temperature" plot of the following reaction is depicted in FIG. 4.

A 500-ml covered, stainless steel beaker charged with 400 grams of powdered, L-aspartic acid was placed in an oil bath. The oil bath was quickly heated to a 550° F. maintenance temperature. The sample was stirred throughout the experiment.

At 24 minutes, the reaction began when the first endotherm was reached. The first endotherm of the reaction mixture peaked at 410° F. at an oil temperature of 470° F.

Evaporative cooling immediately followed the first endotherm. Water loss was evidenced by the evolution of steam. The reaction mixture temperature dropped to a low of 395° F. during this period.

A second endotherm occurred at 1 hour at a reaction mixture temperature of 442° F.

Evaporative cooling continued to take place until the conclusion of the second endotherm. The reaction mixture temperature dropped to a low of 440° F. during this period.

A diminution in evaporative cooling was evidenced by a steady rise in reaction mixture temperature between approximately 1.5 hours and 2.06 hours. At 2.06 hours a temperature plateau was attained. No further increase in percent conversion was noted beyond 1.95 hours.

Table 4 below provides data developed during this experiment. Samples were taken at the times indicated and analyzed for percent conversion to polysuccinimide.

The relative activity of polyaspartic acid produced from the product polysuccinimide was determined by the activity test described above. Activity is reported in terms of pH drop (δpH) and milliliters (ml) of sodium hydroxide, as described in the activity test.

The color of the reaction mixture is provided. Color was observed to vary with product temperature.

TABLE 4

| POLYMERIZATION | | | | ACTIVITY TEST | | |
|---|---|---|---|---|---|---|
| Time, hr. | Product, °F. | Oil, °F. | Conv. % | NaOH, ml | δpH | Color |
| 0.0 | 330 | 348 | 0 | 0.95 | 1.47 | W |
| 0.5 | 405 | 470 | 11 | — | — | LP |
| 1.0 | 436 | 520 | 36 | 1.80 | 0.60 | LP |
| 1.4 | 439 | 536 | 66 | 1.80 | 0.67 | P |
| 1.8 | 462 | 540 | 92 | 1.80 | 0.58 | TP |
| 2.0 | 495 | 544 | 94 | 1.75 | 0.64 | TP |
| 2.4 | 510 | 547 | 96 | 1.75 | 0.58 | LY |
| 3.4 | 512 | 548 | 98 | 1.80 | 0.63 | Y |

Production scale product runs were conducted as follows:

Pilot Plant Test Run #1

Figure 5:
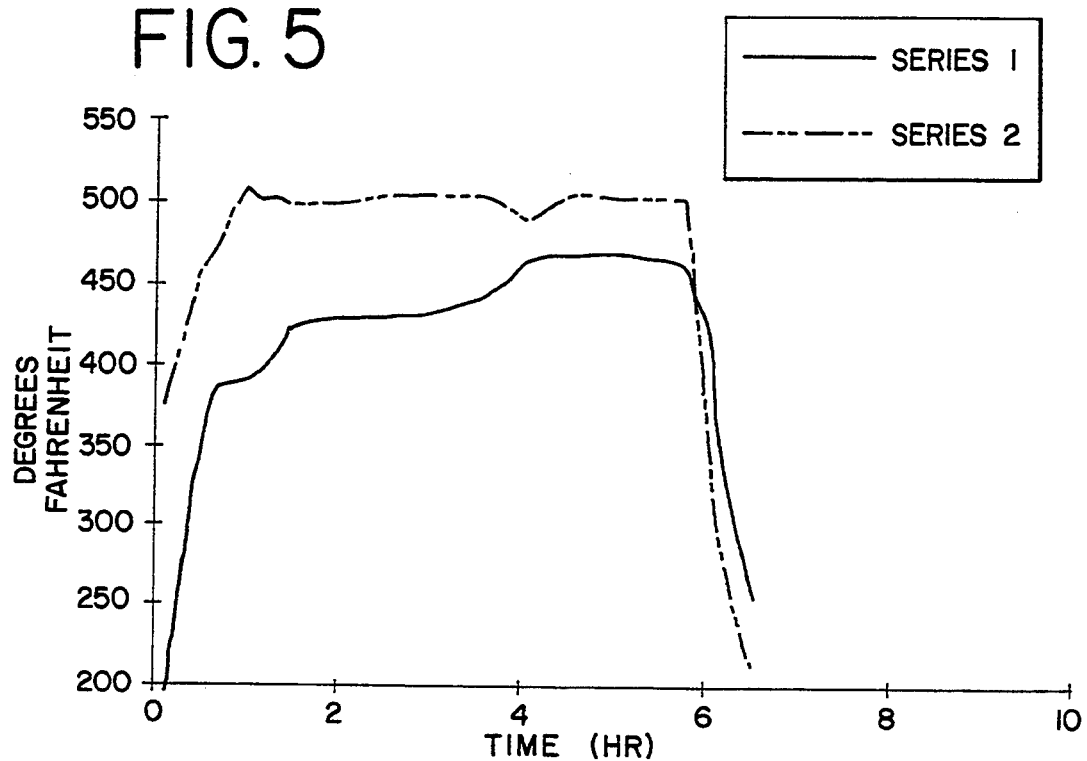
FIG. 5 depicts a temperature versus time reaction curve. Series 2 is the oil temperature. Series 1 is the reaction temperature.

A "time vs. temperature" plot of the following reaction is depicted in FIG. 5.

A DVT-130 drier-mixer manufactured by Littleford Brothers, Inc., of Florence, Ky. was used. The jacketed drier utilizes oil as a thermal fluid and a plough blade impeller. The drier-mixer had a stack open to the atmosphere and a heat transfer area of 10 ft$^2$. The reactor's oil reservoir was preheated to 550° F. to provide an oil inlet temperature of about 500° F.

The reactor was charged with 110.4 lb of powdered, L-aspartic acid. Hot oil began to flow through the jacket, and the impeller speed was set at 155 rpm. Both the product and oil temperatures rose steadily. At a product temperature of 390° F., there was a sudden, endothermic reaction which caused the product temperature to drop (see FIG. 5). Water loss was evidenced by the evolution of steam. A sample taken revealed that the powder had changed from white to pink. Three percent of the material was converted to polysuccinimide.

Thereafter, product temperature began to rise steadily until it reached a plateau at 428° F. which continued for an hour. Throughout this whole reaction, steam evolved, and the conversion increased in a linear fashion. At the end of the hour, the product temperature rose to 447° F. at which time the reaction underwent a second endotherm. Immediately after this endotherm, steam ceased to evolve. Shortly after this point, the reaction was at least 88% complete. Following the second endotherm, the product slowly changed from a pink to a yellow color. The final conversion was measured at 97%. Table 5 below provides data developed during this experiment. Samples were taken at the times indicated and analyzed for percent conversion to polysuccinimide.

TABLE 5

| | POLYMERIZATION | | |
|---|---|---|---|
| Time, hr. | Product, °F. | Oil, °F. | Conv. % |
| 0.0 | 70 | 375 | 0 |
| 0.8 | 390 | 394 | 3 |
| 1.1 | 396 | 504 | 15 |
| 1.5 | 423 | 501 | 24 |
| 2.0 | 430 | 500 | 41 |
| 2.6 | 430 | 506 | 61 |
| 3.6 | 444 | 505 | 84 |
| 4.5 | 471 | 508 | 88 |
| 5.8 | 466 | 506 | 97 |

Pilot Plant Test Run #2

Figure 6:
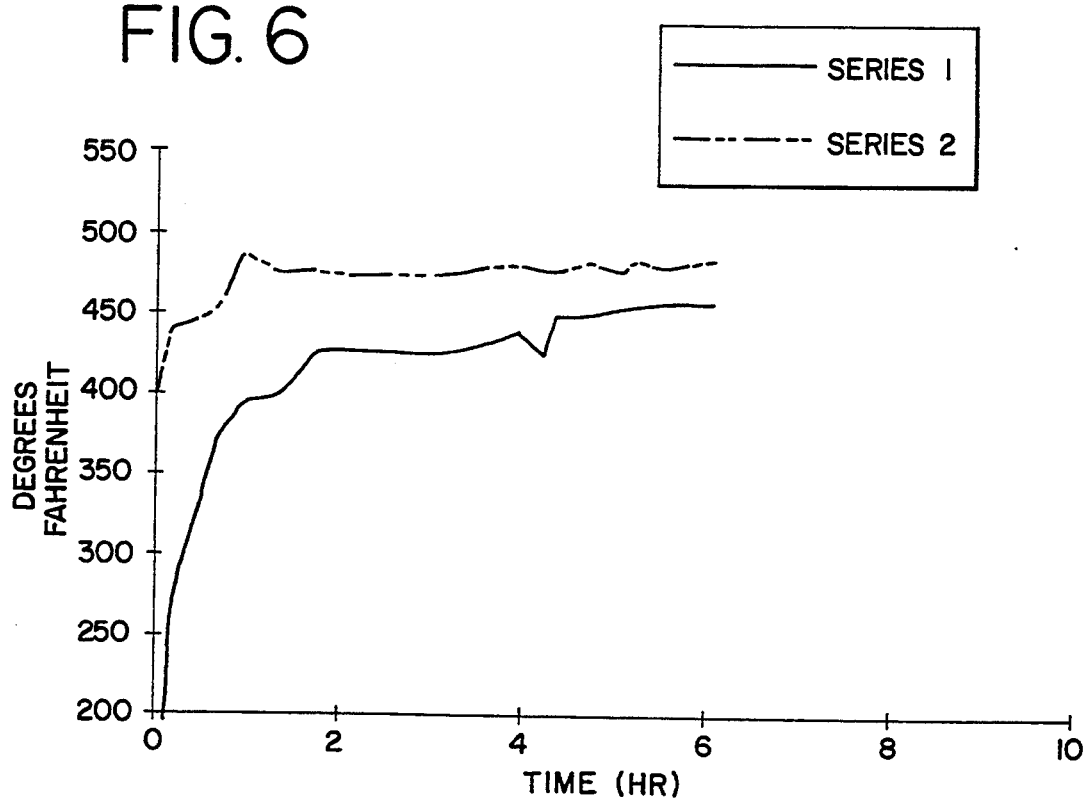
FIG. 6 depicts a temperature versus time reaction curve. Series 2 is the oil temperature. Series 1 is the reaction mixture temperature.

A "time vs. temperature" plot of the following reaction is depicted in FIG. 6.

A Littleford DVT-130 drier-mixer with a heat transfer area of 10 ft$^2$, was charged with 110.4 lb of powdered, L-aspartic acid, and the oil reservoir was preheated to 525° F.

At the start up, hot oil began to flow through the jacket, and the impeller speed was set at 155 rpm. Both the product and oil temperatures rose steadily. The product temperature rose to 393° F. whereupon a sudden, endothermic reaction caused the product temperature to drop (see FIG. 6) and steam began to evolve. A sample taken revealed that the powder had changed from white to pink. Four percent of the material was converted to polysuccinimide. Thereafter, product temperature began to rise steadily until it reached a plateau at 427° F. which continued for one and a half hours. Throughout this whole reaction, steam was evolved, and the conversion increased in a linear fashion. At the end of this time, the product temperature rose to 444° F. until the reaction underwent a second endotherm. Immediately after this second endotherm, steam ceased to evolve. Shortly after this point, the reaction was at least 94% complete. Following the second endotherm, the product slowly changed from a pink to a yellow color. The final conversion was measured at 98%. Table 6 below provides data developed during this experiment. Samples were taken at the times indicated and analyzed for percent conversion to polysuccinimide.

TABLE 6

| | POLYMERIZATION | | |
|---|---|---|---|
| Time, hr. | Product, °F. | Oil, °F. | Conv. % |
| 0.0 | 70 | 400 | 0 |
| 1.0 | 393 | 488 | 5 |
| 1.3 | 400 | 476 | 18 |
| 2.0 | 428 | 475 | 20 |
| 3.9 | 441 | 480 | 66 |
| 4.4 | 450 | 477 | 85 |
| 5.1 | 456 | 476 | 94 |
| 6.1 | 457 | 484 | 98 |

Pilot Plant Test Run #3

Figure 7:
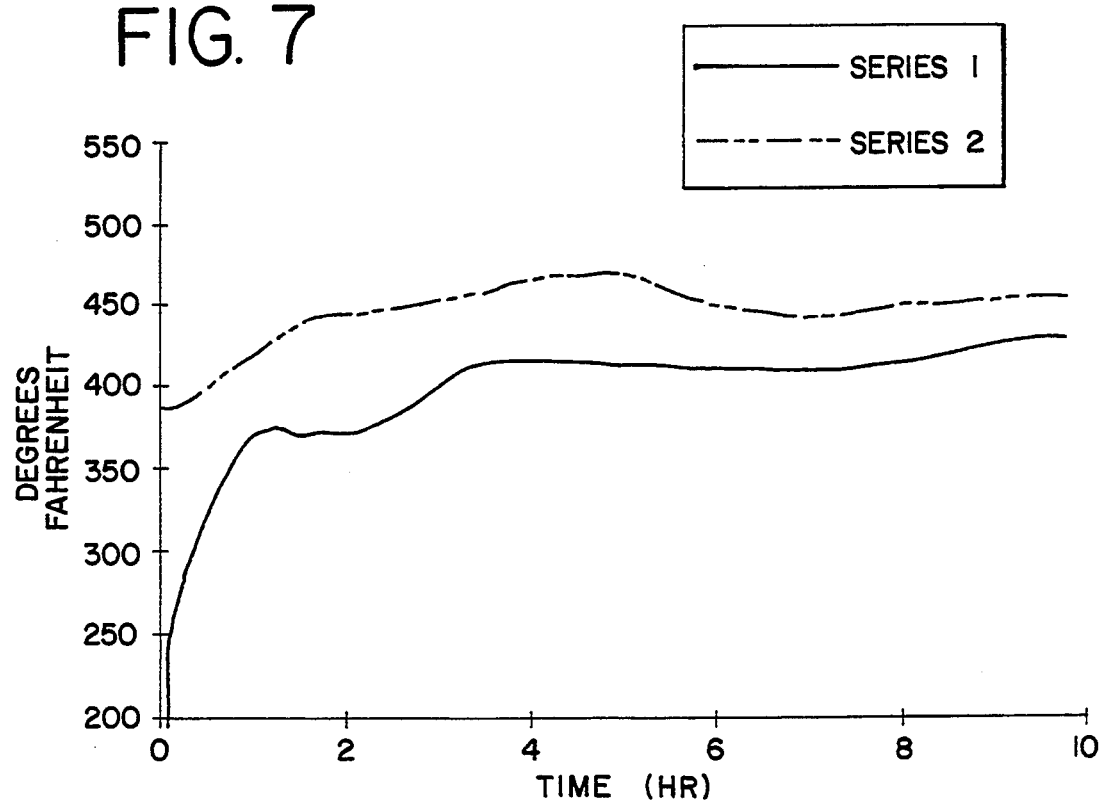
FIG. 7 depicts a temperature versus time reaction curve. Series 2 is the oil temperature. Series 1 is the reaction mixture temperature.

A "time vs. temperature" plot of the following reaction is depicted in FIG. 7.

A "B" blender, manufactured by J. H. Day of Cincinnati, Ohio was charged with 110.4 lb of powdered, L-aspartic acid. The unit was a trough-shaped blender with a plough-bladed impeller and a heat transfer area of approximately 8 ft$^2$. The reactor was wrapped in fiberglass insulation because the oil heater was undersized. The reactor also had a large funnel in a top port open to the atmosphere. The oil reservoir was preheated to 500° F. At the start up, hot oil began to flow through the jacket, and the impeller began to rotate at 74 rpm. Both the product and oil temperatures rose steadily. The product temperature rose to 377° F. whereupon a sudden, endothermic reaction caused the product temperature to drop (see FIG. 7) and steam began to evolve. A sample taken revealed that the powder had changed from white to, pink. Thirteen percent of the material was converted to polysuccinimide. Thereafter, product temperature began to rise steadily until it reached a plateau at 416° F. which continued for 3.75 hours. Throughout this whole reaction, steam was evolved, and the conversion increased in a linear fashion. Due to the heater being undersized, it took a longer time for the product temperature to rise. At the end of this time, the product temperature rose to 435° F. The reaction was at least 88% complete. Due to time limitations, the reaction was stopped when the product temperature reached the plateau. At this point, the final conversion was measured at 90%. Table 7 below provides data developed during this experiment. Samples were taken at the times indicated and analyzed for percent conversion to polysuccinimide.

TABLE 7

| | POLYMERIZATION | | |
|---|---|---|---|
| Time, hr. | Product, °F. | Oil, °F. | Conv. % |
| 0.0 | 55 | 390 | 0 |
| 1.0 | 370 | 420 | 0 |
| 2.3 | 377 | 448 | 13 |
| 3.0 | 403 | 455 | 21 |
| 3.5 | 416 | 460 | 26 |
| 4.0 | 417 | 469 | 32 |
| 4.5 | 416 | 471 | 38 |
| 5.0 | 416 | 472 | 45 |

TABLE 7-continued

| | POLYMERIZATION | | |
|---|---|---|---|
| Time, hr. | Product, °F. | Oil, °F. | Conv. % |
| 5.5 | 415 | 460 | 52 |
| 6.8 | 413 | 446 | 64 |
| 7.3 | 414 | 448 | 70 |
| 7.8 | 418 | 451 | 74 |
| 8.3 | 422 | 455 | 81 |
| 9.3 | 433 | 460 | 88 |
| 9.8 | 435 | 460 | 90 |

These experiments show that degree of conversion of L-aspartic acid and the time required for conversion are related to the temperature of the reaction mixture.

The higher the temperature of the thermal fluid used to heat the reaction mixture, the higher the degree of polymerization and the faster the rate of conversion.

Because of normal heat losses the temperature of the thermal fluid will always be higher than the temperature of the reaction mixture. It is known that increasing the temperature of the thermal fluid will increase the driving force of the reaction. Assuming that the thermal fluid temperature will be raised to its maintenance temperature in a reasonably short period of time, we have found that generally the following has held true:

Where the oil maintenance temperature was 425° F., at the end of 5 days only 60% conversion was achieved. The equilibrium temperature of the reaction mixture appeared to be 400° F.

Where the oil maintenance temperature was 450° F., 90% conversion took place within 7 hours. The equilibrium temperature of the reaction mixture is not known.

Where the oil maintenance temperature was 500° F., 90% conversion took place within 4 hours. The equilibrium temperature of the reaction mixture was 477° F.

Where the oil maintenance temperature was 550° F. 90% conversion took place within 2 hours. The equilibrium temperature of the reaction mixture was 510° F.

The difference between the maintenance temperature and the reaction temperatures provides the driving force. Different means for providing the thermal energy can result in different driving forces. Thus, although the relations derived here are qualitatively valid, there may be some quantitative differences found in different systems. Different thermal resistances will result in a shift in temperature and/or time requirements.

The systems tested here tend to have high thermal resistance. For systems with less thermal resistance, lower source temperatures will suffice to provide equivalent results.

The data indicates that continuous as well as batch processes can be used. The relationships discussed above are equally valid for both. Based on the data presented herein, a number of different reactors can be used. Examples of these include, but are not limited to a heated rotary drier; a thin-layer plate reactor; a stirred reactor; a fluidized bed and the like. The reaction can be carried out at ambient pressure or under a vacuum, as desired. The reaction can occur in air or a variety of atmospheres, inert or otherwise. As a further example, an indirectly heated rotary drier providing the same residence time as the DVT 130 drier-mixer provides similar results under the same operating conditions.

THERMAL CONDENSATION IN A STIRRED REACTOR

Apparatus: a hollow, cylindrical, stainless steel, jacketed vessel in the form of a pan with a height of approximately 150 mm and a diameter of 400 mm. The vessel was fitted with four arms, each with several attached plows. Thermal fluid was used to heat the vessel.

Procedure: The vessel was preheated to the desired temperature. A layer of L-aspartic acid was deposited in the pan and spread evenly across the pan. Samples were taken periodically to measure extent of reaction and conversion to polysuccinimide. Evolved steam was condensed. The observed results are set forth in Table 8, below.

THERMAL CONDENSATION ON A PLATE DRIER

Pilot plant scale tests were performed in a Krauss Maffei VTA 12/8 plate drier having eight stainless steel plates with a diameter of 1200 mm. The drier was operated in ambient atmosphere. The first two plates were maintained at a relatively lower temperature than the next five. The last plate was not utilized due to temperature control problems. Each plate has 0.35 $m^2$ of heat transfer surface and four arms of plows. Except for the first plate, the fourth arm of each plate had the plows

TABLE 8

| Test No. | Plate Temp. (°F.) | Sample No. | Conversion (%) | Time (min) | Plow Type[1] | Layer Depth (mm) | Comments |
|---|---|---|---|---|---|---|---|
| 1 | 500 | 1 | 33.88 | 20 | Standard | 13 | |
|   |     | 2 | 95.18 | 60 |          |    | |
|   |     | 3 | 100.00 | 90 |         |    | |
|   |     |   |        | 180 |        |    | |
| 2 | 400 | 1 | 1.8 | 40 | Window | 18 | |
|   |     | 2 | 8.4 | 70 |        |    | |
|   |     |   |     | 80 |        |    | |
| 3 | 430 | 1 | 2.1 | 10 | Window | 18 | |
|   |     | 2 | 3.3 | 20 |        |    | |
|   |     | 3 | 7.7 | 30 |        |    | |
|   |     | 4 | 12.5 | 40 |       |    | |
|   |     | 5 | 19.5 | 50 |       |    | |
|   |     | 6 | 22.8 | 60 |       |    | |
| 4 | 500 | 1 | 27.5 | 10 | Window | 18 | Cont. of No. 3 |
|   |     | 2 | 51.2 | 30 |       |    | |
|   |     | 3 | 76.6 | 50 |       |    | |
|   |     | 4 | 97.0 | 70 |       |    | |
|   |     |   |      | 80 |       |    | |
| 5 | 430 | 1 | .2 | 10 | Window | 17 | |
| 6 | 500 | 1 | 16.1 | 15 | Window | 18 | Cont. of No. 5 |
|   |     | 2 | 28.9 | 30 |       |    | |
| 7 | 430 | 1 | 5.1 | 20 | Window | 18 | |
|   |     |   |     | 20 |        |    | |
| 8 | 500 | 1 | 24.2 | 15 | Window | 18 | Cont. of No. 7 |
|   |     | 2 | 39.5 | 30 |       |    | |
| 9 | 430 | 1 | 25.2 | — | Standard | 15 | |
|   |     |   |      | 15 |         |    | |
| 10 | 500 | 1 | 37.3 | — | Standard | 15 | Cont. of No. 9 |
|    |     | 2 | 66.9 | — |         |    | |
|    |     | 3 | 91.0 | — |         |    | |
|    |     | 4 | 99.6 | — |         |    | |
|    |     | 5 | 99.5 | — |         |    | |
|    |     |   |      | 110 |        |    | |
| 11 | 500 | 1 | 10.2 | — | Serrated | 15 | |
|    |     | 2 | 30.7 | — |          |    | |
|    |     | 3 | 40.6 | — |          |    | |
|    |     | 4 | 54.4 | — |          |    | |
|    |     | 5 | 71.9 | — |          |    | |
|    |     | 6 | 88.2 | — |          |    | |
|    |     |   |      | 60 |         |    | |
| 12 | 455 | 1 | 6.7 | — | Standard | 15 | |
|    |     | 2 | 13.2 | — |         |    | |
|    |     |   |      | 15 |         |    | |
| 13 | 464 | 1 | 8.1 | — | Standard | 15 | |
|    |     | 2 | 15.2 | — |         |    | |
|    |     |   |      | 15 |         |    | |
| 14 | 500 | 1 | 18.3 | — | Standard | 15 | Cont. of No. 13 |
|    |     | 2 | 43.3 | — |         |    | |
|    |     | 3 | 73.9 | — |         |    | |
|    |     | 4 | 95.9 | — |         |    | |
|    |     | 5 | 99.2 | — |         |    | |
|    |     |   |      | 60 |         |    | |
| 15 | 474 | 1 | 26.6 | — | Standard | 15 | |
|    |     |   |      | 20 |         |    | |
| 16 | 500 | 1 | 52.3 | — | Standard | 15 | Cont. of No. 15 |
|    |     | 2 | 85.3 | — |         |    | |
|    |     | 3 | 98.6 | — |         |    | |
|    |     | 4 | 99.4 | — |         |    | |
|    |     | 5 | 99.3 | — |         |    | |
|    |     |   |      | 75 |         |    | |

[1] In the above table, "standard" denotes a 90 mm solid plow; "window" indicates that the center portion of each plow has been cut-out; and "serrated" denotes a plow in which the bottom of the plow has teeth.

moving in reverse in order to increase the retention time and the turnover rate.

L-aspartic acid powder was delumped and then fed to the first plate of the drier. The plows evenly distributed the deposited L-aspartic acid until thin ridges covered the plate. The deposited powder followed a spiral across the plate until it was pushed off the edge onto the next plate. There the process was repeated until the powder was swept off the center of the plate. Once process conditions stabilized, samples were taken from each plate to measure extent of reaction. The conversion of L-aspartic acid to polysuccinimide could be followed by noting the color change of the powder by plate. The powder on the initial plates was observed to be light pink, on the middle plates a yellowish salmon, and on the final plates yellow-tan.

The observed results are compiled in Table 9, below.

TABLE 9

| Test No. | Plate Temp. (°F.) | Air Flow (ft/min) | Air Temp. (°F.) | Plate No. | Conversion (%) | Residence Time,[2] (min) |
| --- | --- | --- | --- | --- | --- | --- |
| A | 435 | 19 | 485 | 1 | 9.76 | 68.5/65.6 |
|   |     |    |     | 2 | 12.38 |          |
|   | 480 |    |     | 3 | 34.85 |          |
|   |     |    |     | 4 | 62.24 |          |
|   |     |    |     | 5 | 66.78 |          |
|   |     |    |     | 6 | 91.30 |          |
|   |     |    |     | 7 | 98.63 |          |
|   |     |    |     | discharge |   |          |
| B | 430 | 17 | 460 | 1 | 4.93 | 68.5/69.2 |
|   |     |    |     | 2 | 16.44 |          |
|   | 495 |    |     | 3 | 26.47 |          |
|   |     |    |     | 4 | 50.94 |          |
|   |     |    |     | 5 | 66.90 |          |
|   |     |    |     | 6 | 80.35 |          |
|   |     |    |     | 7 | 96.50 |          |
|   |     |    |     | discharge | 90.97[3] |     |
| C | 430 | 17 | 460 | 1 |       | 61.8/—  |
|   |     |    |     | 2 |       |          |
|   | 495 |    |     | 3 |       |          |
|   |     |    |     | 4 |       |          |
|   |     |    |     | 5 |       |          |
|   |     |    |     | 6 |       |          |
|   |     |    |     | 7 | 98.72 |          |
|   |     |    |     | discharge |   |          |
| D | 440 | 17 | 462 | 1 | 19.71 | 61.8/42.1 |
|   |     |    |     | 2 | 35.39 |          |
|   | 511 |    |     | 3 | 39.01 |          |

TABLE 9-continued

| Test No. | Plate Temp. (°F.) | Air Flow (ft/min) | Air Temp. (°F.) | Plate No. | Conversion (%) | Residence Time,[2] (min) |
| --- | --- | --- | --- | --- | --- | --- |
|   |   |   |   | 4 | 89.52 |   |
|   |   |   |   | 5 | 99.01 |   |
|   |   |   |   | 6 | 99.03 |   |
|   |   |   |   | 7 | 99.40 |   |
|   |   |   |   | discharge | 99.67 |   |

[2]Total time spent in reactor/Calculated time based on 98% conversion.
[3]Includes by-pass from feeder.

Polysuccinimide produced in the foregoing manner can be readily converted to polyaspartic acid by base hydrolysis.

We claim:

1. A method for producing polysuccinimide, comprising the steps of
   (a) heating powdered L-aspartic acid to at least 370° F. to initiate the condensation reaction and produce a reaction mixture, then
   (b) raising the reaction mixture temperature to at least 450° F., and
   (c) maintaining at least the 450° F. temperature for the reaction mixture until at least 80% conversion has occurred.

2. The method of claim 1, wherein the reaction mixture temperature is raised to at least 430° F. for a period of time sufficient to effect at least 90% conversion to polysuccinimide.

3. The method of claim 1, wherein the reaction mixture temperature is raised to at least 440° F. and maintained for a period of time sufficient to effect at least 95% conversion to polysuccinimide.

4. The method of claim 1, wherein a thermal fluid is used to heat the reaction mixture and the temperature of the thermal fluid is raised to a maintenance temperature of at least 500° F. and maintained at said temperature to effect at least a 90% conversion to polysuccinimide.

5. The method of claim 4, wherein the thermal fluid is brought to a maintenance temperature of at least 550° F. to effect at least 90% conversion to polysuccinimide within about 2 hours.

6. The method of claim 1, further including the step of agitating the reaction mixture during the heating process for the purpose of facilitating heat transfer to the reactants.

7. The method of claim 1 further including the step of hydrolyzing the produced polysuccinimide with a base.

* * * * *

UNITED STATES PATENT AND TRADEMARK OFFICE
CERTIFICATE OF CORRECTION

PATENT NO. : 5,391,764
DATED : February 21, 1995
INVENTOR(S) : Larry P. Koskan et al.

It is certified that error appears in the above-indentified patent and that said Letters Patent is hereby corrected as shown below:

Col. 5, line 66, "450°F." should be — 420°F. —.

Col. 11, Table 8, last entry in 4th column, "99.3" should be — 99.5 —.

Col. 14, line 22, "450°F." should be — 420°F. —.

Col. 14, line 23, "450°F." should be — 420°F. —.

Signed and Sealed this

Twelfth Day of September, 1995

Attest:

BRUCE LEHMAN

*Attesting Officer*   *Commissioner of Patents and Trademarks*